United States Patent [19]

Geronimi

[11] Patent Number: 5,191,608
[45] Date of Patent: Mar. 2, 1993

[54] METHOD FOR THE MANAGEMENT OF AN APPLICATION PROGRAM LOADED IN A MICROCIRCUIT MEDIUM

[75] Inventor: Francois Geronimi, Aix en Provence, France

[73] Assignee: Gemplus Card International, Gemenos, France

[21] Appl. No.: 757,726

[22] Filed: Sep. 11, 1991

[30] Foreign Application Priority Data

Sep. 12, 1990 [FR] France ................................ 90 11293

[51] Int. Cl.$^5$ .............................................. H04L 9/00
[52] U.S. Cl. ........................................... 380/4; 380/25
[58] Field of Search ............................... 380/4, 23, 25

[56] References Cited

U.S. PATENT DOCUMENTS

| | | | |
|---|---|---|---|
| 4,656,474 | 4/1987 | Mollier et al. | 380/23 |
| 4,807,288 | 2/1989 | Ugon et al. | 380/4 |
| 4,907,272 | 3/1990 | Hazard et al. | 380/23 |
| 4,910,773 | 3/1990 | Hazard et al. | 380/25 |
| 4,910,774 | 3/1990 | Barakat | 380/23 |
| 4,926,480 | 5/1990 | Chavin | 380/23 |
| 5,068,894 | 11/1991 | Hoppe | 380/23 |
| 5,083,309 | 1/1992 | Beysson | 380/4 |

FOREIGN PATENT DOCUMENTS 0030381  6/1981  European Pat. Off. .
0299826  1/1989  European Pat. Off. .
2503423 10/1982  France .

OTHER PUBLICATIONS

R. L. Rivest, et al., "A method for obtaining digital ..." Communications of the ACM, vol. 21, No. 2, Feb. 1978, pp. 120-126.

Primary Examiner—Salvatore Cangialosi
Attorney, Agent, or Firm—Roland Plottel

[57] ABSTRACT

To provide protection for the use of chip cards, the microprocessor of such a card is made, during the use of the card, to compute a signature according to complex encrypting algorithm taking account, firstly, of a secret code proper to the card and, secondly, of the instructions proper to the program. The signature thus computed is compared with a signature that has been pre-recorded in the card under the same conditions at the time of its delivery by the card-issuing party. It is shown that several uses can be authorized without jeopardizing their security.

7 Claims, 2 Drawing Sheets

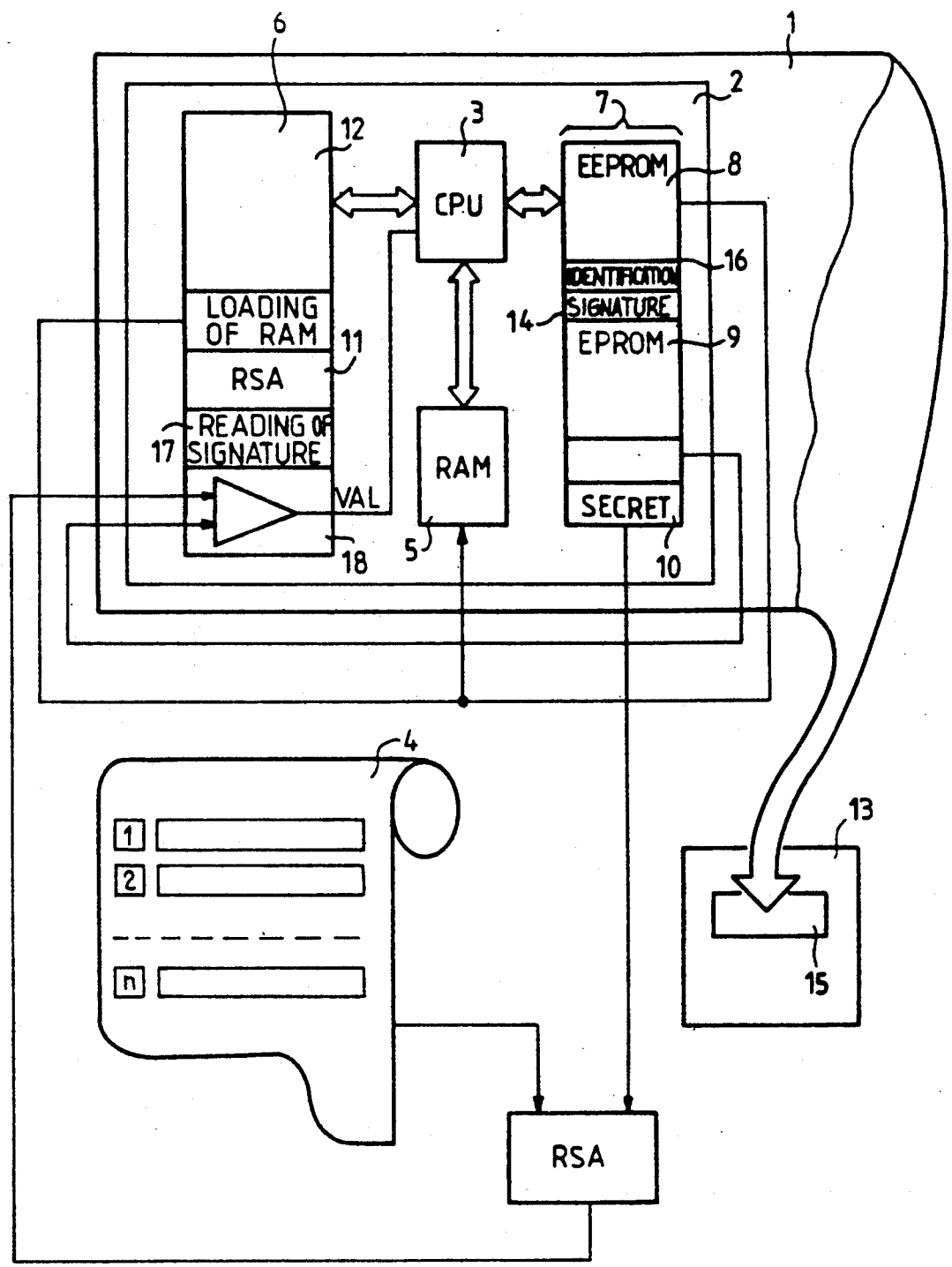
FIG_1

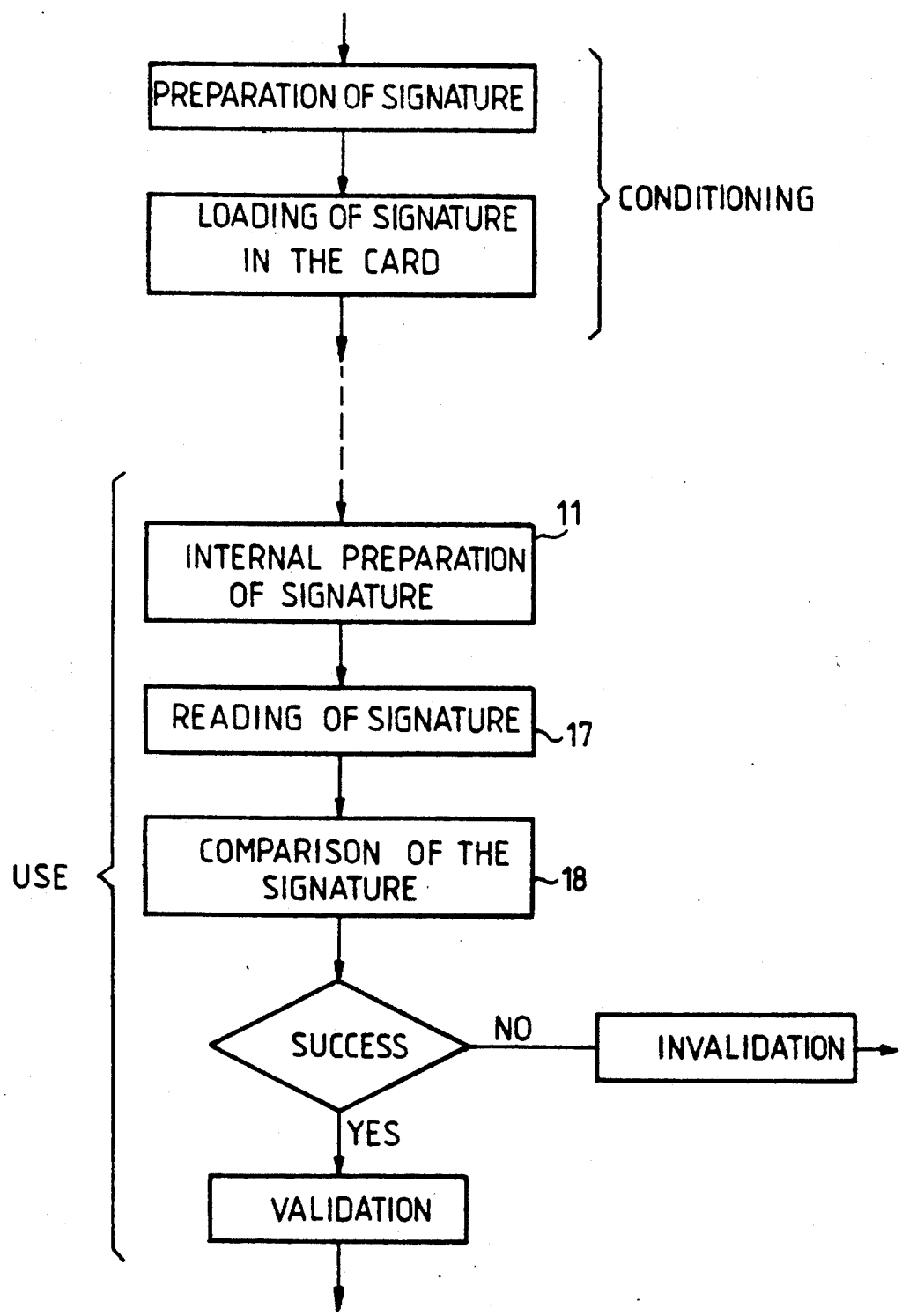
FIG_2

METHOD FOR THE MANAGEMENT OF AN APPLICATION PROGRAM LOADED IN A MICROCIRCUIT MEDIUM

BACKGROUND OF THE INVENTION

1. Field of the Invention

An object of the present invention is a method for the management of an application program loaded into a microcircuit medium. In a preferred use, the microcircuit medium is a so-called electronic chip card that can be used for many other transactions. The invention is aimed at placing such microcircuit-based media at the disposal of numerous services which may be called card-issuing services because, with the electronic intelligence that they carry, these cards can be used to simplify the management of these services.

A microcircuit-based medium comprises, firstly, a medium, often constituted in the form of a card such as the credit card and, secondly, an electronic circuit provided, on the surface of the medium, with means of communicating with the external world. These communication means are often simple metallized surfaces which, besides, are connected to the microcircuit and permit electrical contacts. However, it is possible to organise a relationship between the external world and the electronic circuit that is without electrical contact: for example by means of electromagnetic transmissions.

In its broadest definition, a microcircuit of the type used in chip cards comprises, firstly, a microprocessor that is the true driving element of the card and, secondly, a set of memories having different functions. It can be assumed that a microcircuit such as this thus has three types of memory, even it is true that the functions and technologies of these memories can be intermingled to the point where it is difficult to distinguish between these memories. However, we may note the existence of a working random-access memory, called a RAM, the technology of which is often of a static or dynamic type. A microcircuit also has a read-only memory, called a ROM or, again, a program memory, containing the application program. This ROM normally cannot be programmed externally by the user and needs to be programmed either by masking by the manufacturer of the microcircuit or by the party who issues this card before subsequently preventing access, in writing mode, to this ROM (generally through the disruption of a fuse). A third known type of memory is the electrically erasable programmable read-only memory, for example of the EEPROM or FLASH EPROM type. These programmable memories enable the entering of data pertaining to the application: numbers, dates and times of the use of the card for the applications concerned, dates and amounts withdrawn from a bank account, and more generally data relating to the transaction. The ROMs and EPROMs are generally non-volatile.

The microprocessor is normally capable of carrying out the application programs contained in the ROM, either by directly reading the instructions to be carried out in this memory or by having previously prompted the transfer of these instructions into the RAM and by executing them from this RAM itself. Thus, there are two known types of microprocessor. The first type has an instruction capable of initialising the execution of the program on the first instruction contained in the ROM. The second type possesses an instruction capable of prompting this transfer. Both types can coexist in one microcircuit. In this case, one of these functions may be neutralised if necessary.

Several actors can be distinguished in the phenomenon of the use of the microcircuit cards. Firstly, there are microcircuit manufacturers, secondly there are card issuing parties and finally there are card users. The functions of the cards get reduced as and when they pertain to actors placed further down the line in this chain. This means that, for the microcircuit manufacturer, the electronic microcircuit potentially possesses all the possible internal programming capacity. The existence of this capacity can be expressed by the observation that none of the access limiting fuses has yet been disrupted. However, even if no fuse is involved, it can be assumed that, for the manufacturer, this potential capacity is not limited by a set of programming instructions proper to the microprocessor either.

Card-issuing parties, for example the banks, generally ask the manufacturer to make an unerasable programming of the applications that they need and that they wish their customers to possess, either by masking in a ROM or by software programming and by the subsequent disruption of the writing access fuse in an EPROM type memory. The first consequence of this is that the function of the microcircuit is fixed and that its use is limited to the application considered. However, the bank may think of developing its relationships with its customers by giving the card other functions. It may then do so, if only by turning to the manufacturer and asking him to make other cards with other masks. This is a lengthy process and one that lacks flexibility.

This manufacturing method has another drawback related to the fact that other services, for example social health organisations, car park management companies etc. have to adopt one and the same programming mode. The fact of using this same programming mode means that the burden of programming the applications in the microcircuits is borne by the manufacturer of the microcircuit.

Any other method would entail risks. The first risk is that one vendor of services could use his microcircuit programming tools to simulate the services of another vendor. For example, a car park management company could fraudulently seek to simulate a banking application. This risk would exist also among the manufacturers. Negligence during manufacture or during the delivery of the blank microcircuits to the issuing parties could result in ill-intentioned persons having, at their disposal, programmable microcircuits which could be given the functions of a particular card only to a partial extent and could be additionally given functions normally forbidden to it.

To overcome these drawbacks, there is already a known way, referred to here above, of making the manufacturer load the application into a ROM. The application is fixed from the very outset and can no longer be modified by any means. Another known possibility is that of loading application programs in programmable memories and subsequently limiting access to these memories in programming mode by the disruption of a fuse. It will be understood that the latter type of programming is favourably received by issuing parties because it is more flexible in its use. It will also be understood that this method of working is, nonetheless, more dangerous for the other issuing parties. For, although the manufacturer can limit the potential uses of the circuit, these limits can be circumvented in a perverse manner.

In the invention, it is proposed to resolve this problem by requiring that the application should protect itself. To do this, in this application, there is additionally included an encrypting program entrusted with establishing a signature on the basis, firstly, of a secret code proper to the card and, secondly, of the instructions of the application program itself. If this encrypting program is not included in the application itself, it nevertheless exists and should be triggered, periodically, by the microprocessor. Its action relates to the instructions of the application. This signature is then itself loaded into the data memory of the card. This signature is therefore quite legible in this memory. The card thus includes the secret code and the signature in its program memory. In its program memory, the card has, firstly, the application program (all the instructions of this program) and, secondly, an encrypting algorithm identical to the one with which the signature has been prepared. The application may be stored in an erasable programmable memory. The encrypting algorithm is stored only in an unprogrammable read-only memory. The function of this algorithm is limited to the computation of the signature, and it cannot prompt the writing of this signature in the data memory.

When it is desired to use the card, it is then enough, at each use, to ascertain that the new computation of the signature, on the basis of the instructions of the program and of the secret code, is truly equal to the already recorded signature. Under these conditions, the entire potential of the cards can be placed at the disposal of all the card-issuing parties. None of them will be able, whether inadvertently or by ill intention, to partially simulate the application of another card-issuing party. The card will have to be simulated at least in its totality. When the card is simulated in its totality, fewer risks are attached to it since the use must comply with the one assigned by the issuing party.

To make the system perform even more efficiently, it is possible to envisage bringing the reader, with which the card is in a relationship of communication, into play in the verification process. For, the encrypting algorithm takes account successively of the binary information elements contained in the instructions of the application program. With this sequence of instructions and with the secret code, it computes the signature. It is possible, however, during this encrypting operation, to introduce another binary sequence from the reader, tending to modify the signature, provided that this binary sequence was also entered when the signature was inserted into the card. It is seen that the application is completely protected, firstly by the secret code of the card and, secondly, by the limiting of the instructions of the application program which is strictly followed and, finally, by the action of the card-issuing party.

In the last-mentioned case, it is even possible to modify the signature. This modification is done on the initiative of the card-issuing party. He may decide, for example that, from a certain date onwards, the binary sequence introduced by the readers will be different. During the first insertion of a card in a reader following this decision to modify the binary sequence, the reader recognises the existence of the former signature and, after the card has been validated, and according to a protected protocol, this reader reprograms a new signature in the card, which will be used for subsequent verifications.

SUMMARY OF THE INVENTION

An object of the invention is a method for the management of an application program in a microcircuit-based medium, comprising the following steps:
  an encrypted signature is prepared as a function of a secret code of the microcircuit and certain instructions of the program;
  this signature is loaded into a programmable memory of the microcircuit;
  the program is loaded into a program memory of the microcircuit;
  during the execution of the application program, the microprocessor of the microcircuit is made to prepare another encrypted signature;
  the encrypted signature prepared is compared with the one recorded; and
  the program is allowed to proceed according to the result of this comparison.

BRIEF DESCRIPTION OF THE DRAWINGS

The invention will be understood more clearly from the following description and from the accompanying figures. These figures are given purely by way of indication and in no way restrict the scope of the invention. Of these figures:

FIG. 1 shows a functional diagram of the card management system, according to the invention;

FIG. 2 shows the logical sequence of the phases of the management method according to the invention;

DETAILED DESCRIPTION OF THE INVENTION

FIG. 1 gives a schematic view of the management system that can be used to implement the method of the invention. It shows a medium containing the microcircuit 2. In a standard application, the medium 1 is a chip card made of plastic and the microcircuit 2 is an electronic circuit. The microcircuit 2 has means (not shown) of communication with the external world and a microprocessor 3 capable of working under the control of a program 4 loaded in a random-access memory 5, a pre-programmed read-only memory 6 or a programmable memory 7 (in a part 9 of this memory 7 that can no longer be written in or, on the contrary, in a part 8 in which it is possible to write and read permanently). We shall describe the case where the application is stored in a read-only memory 6 and then loaded in a random-access memory 5 in order to be carried out. However the invention is wholly applicable to cases where the program that can be executed is executed directly from the memory where it is stored, the memory 6 or the memory 7, without being transferred to the random-access memory 5. In this case, the microprocessor 3, through its internal working, knows that it is possible for it to look for the instructions in such memories. In the present case, when the operation is started up, the microprocessor loads all or a part of the program that can be executed into the RAM 5.

In addition to the "RAM loading" function for the loading of the application program, the main program of the microprocessor includes another obligatory function of the algorithm type (RSA or DES type algorithm) tending to make it carry out the checking operation of the invention. There is therefore no possibility of avoiding it.

In the recordable parts 9 of the memory 7, a secret code of the card has been recorded. This secret code is recorded in the card by the party issuing the application program. It is not accessible in reading mode for display or transfer to an input-output bus of the card. It is accessible only internally: the microprocessor can make computations with this secret code. The secret code is stored in a region 10 that is completely inaccessible through the external channels of the memory 7 (or of the memory 6 as the case may be).

When the issuing party wishes to put the cards into service, he loads the secret code into the card. The issuing party also knows the identification of the card: this is its manufacturing number or its series number. Finally, the issuing party also knows the program 4 that he wishes to introduce into the microcircuit 2. In the example described, this program is stored in a region 12 of the memory 6. In a region 11 of this memory 6, there is stored an RSA type encrypting algorithm. The RSA type encrypting algorithm is known and has been published in an article by Rivest R. L., Shamir A. and Adleman L. M., "A Method For Obtaining Digital Signatures And Public-Key Cryptosystems" in Communication of the ACM, Vol. 21, 1978, pp. 120–126.

The invention can naturally be implemented with encrypting algorithms other than this one. In particular, for a same purpose, there is another known algorithm, known as the DES.

These algorithms essentially consist in computing a signature from a certain number of data elements that are communicated to them. In the invention, the data elements communicated are the secret code of the card, possibly the identification but, above all, the n instructions of the program 4. These instructions may be considered to be data elements since only their binary sequence form is taken into account for the computation of the signature. It must be noted, however, that it is not necessary to introduce all the instructions of the program 4 into this algorithm during the encrypting operation. It is possible, for example, to decide to take one in every two instructions only, or else only one, or again any other desired combination. This should be provided for in the execution of the RSA algorithm which will seek data elements, as and when it runs on, at the positions in from it has been instructed to take these data elements. When the signature has to be changed, rather than entering a data element external to the card by means of a reader 13 which is designed to receive it, it may be decided to prepare a new signature on the basis of other instructions contained in the n instructions of the program 4, or else on the basis of the same instructions but taken in a order different from the one in which they were stored.

FIG. 2 provides for a clear understanding of the working of the invention. When the card is being conditioned, i.e. provided with all the necessary information, notably the instructions to n of the program 4, the signature is computed by performing the RSA algorithm outside the card. The signature thus computed is loaded in a region 14, preferably located in the memory 7. The region 14 may be permanently accessible in reading mode: it does not need to be specially protected. It may even be accessible in writing mode: any unwarranted modification of its contents would result in the failure of the proposed use of the application. To prepare the signature, it is also possible to use a secret code dedicated to this use in the card. This code may be loaded into the card during this conditioning operation.

During use, when the card 1 is inserted into the slot 15 of the reader 13, the first instruction prompted by the activation of the circuit is, as the case may be, the loading of the application program into the working memory 5. Once this program has been loaded into the memory 5, the microprocessor 3 irreversibly sets off the preparation of the signature by means of the encrypting RSA algorithm stored in the region this time internally. The preparation of the signature internally by the microprocessor 3 consists in making a search, firstly, for the secret code stored in the region 10, possibly also the identification located in the region 16 and, secondly, for the instructions of the program stored either in the region 12 of the memory 6 or in the memory 5, and in performing the encrypting computations on these data elements. Once the microprocessor 3 has completed its signature preparing operation, it prompts, again irreversibly through the instruction 17, the reading of the signature stored in the region 14 of the memory 9. This signature read in the region 14 is then compared with the prepared signature during the execution of a comparison instruction stored in a region 18 of the memory 6. This comparison is done bit by bit. Depending on whether this comparison is a success or a failure, a signal is put out, to validate the working of the microprocessor or else to invalidate it.

Ultimately, the implementation of the invention necessitates the prior execution, i.e. the execution, when the microcircuit starts operation, of the computation of the algorithm according to instructions contained in the region 11, then the reading of the signature and, finally, the execution of the comparison instruction located in the region 16. The loading of the program into the working memory 5 can be done after these three operations, of course only in the event of success. It is therefore enough, in this case, to manufacture microprocessors such that, when they start working they will go directly to the first instruction located in the region 11. Otherwise, their first instruction should be to load at least the instructions 11, 17 and 18 in the RAM. Rather than a single verification done at the start of the program, it is possible to provide for more regular checks during the running of this program, for example after each execution of ten instructions, or even under the authority of the reader that prompts the use of the program.

It is seen that the coherence of the program with the card is checked internally, without any intervention whatsoever by the operator.

It has been stated that the card is designed to provide for relationships with the external world, whatever they may be. It would therefore be possible for a fraudulent individual to create his or her own program (which would obviously be a program prejudicial to the issuing party whom this fraudulent individual is seeking to rob). It may even be assumed that it could be possible for this fraudulent person to know the secret code as well as the identification of the card and, besides, since the RSA algorithms are known and accessible to the public, to load a signature himself into the memory 7 and thus try and render this verification and this validation illusory. To avert this situation, it is possible to provide for a system where, when the card is communicating with the external world, this external world substitutes its instructions, which are coherent ones, for those of the microcircuit 2 in order to compute the signature.

The invention can be applied in the field of subscriber television services. In a subscriber television system, the time base signal of the video signal may be considered to be ahead or delayed in time, for each of the image lines, as a function of a particular encoding. When no action is taken on the video signal shown on the television set, the lines are lagged with respect to one another and the image is scrambled. The starting instant of the scanning of each line can be resynchronized by means of an automaton which affects its advance or delay inversely to the scrambling.

This automaton performs a computation algorithm on a code word. The result of this computation constitutes the sequence of delays and advances on a frame of the television mode. A case may be assumed where the scrambling mode changes every month and where, consequently, to unscramble the image on his set, each subscriber has to enter a new code word into the automaton. This new code word is transmitted to the subscriber by the TV network authority, if the subscriber has paid the fee. The problem to be resolved then is the one resulting from the disclosure of the algorithm of the automaton. The company that manages the subscriber television decoders may then wish to make periodic changes in the mode of operation of its automatons: it may wish to change this algorithm. Rather than having to change the decoders themselves, which are costly elements, the approach envisaged is that of placing the intelligence of the automatons in these microcircuit cards. Thus, changing the mode of operation of the automaton would mean changing its cards. However, since this solution is itself too costly, it is planned with the invention to reload another algorithm into the cards by the r.f. transmissions themselves. In this case, therefore, the situation is one where the program that can be executed has to be loaded no longer into a memory that is accessible only in reading mode, such as the memory 6, but into a memory such as the memory 8 which should even be accessible in writing mode. The loaded program is thus made public.

Thus, the program is preferably loaded into an erasable and programmable memory 8. The secret code used for the signature is preferably a secret code specific to the preparation of this signature. This secret code could be different from the secret code used by the bearer to validate the use of his card. It is furthermore possible to give a specific character to each program for each card (or for groups of cards possessing a same identification).

The working of the invention is as follows in the utilisation with the television. The issuing party sends a specific message dedicated to each card by electromagnetic r.f. transmission. This message comprises, firstly, an identification IN and, secondly, the new instructions NL of the algorithm and the new signature SN. This new signature SN then necessarily includes a participation of the identification IN of the card in its preparation. Or this signature SN includes a participation of the secret code CS of the card. Even the two are participating. For the customer, the main program of the microprocessor of the card or of the decoder then includes an option by which it can be placed in a state of accepting modifications. In this state, the decoder or the card moves into modification as soon as the identification code IN is recognised. When the identification IN of a card is recognised, the microprocessor accepts the new program NL and the new signature SN. The recognition of the identification is done by the comparison of an identification transmitted by electromagnetic r.f. waves with the identification present in the card. The modification protocol is itself also a fixed protocol: the microprocessor allows operation only when the modification is over.

Once this modification is carried out, the card contains the new programme NL of the algorithm and the new signature SN. The new programme may have replaced all or part of the old one. In order to validate the functioning of the decoder, when the decoder is switched on, the microprocessor of the card computes a new signature S'N taking into account the new instruction NL, the identification IN, and possibly the secret code CS. If S'N is equal to SN, validation occurs. If not, the decoder does not work.

Of course the network authority does not send specific messages for customers who have not paid the fee.

In order to transmit a new algorithm, a duration of 0.1 seconds per subscriber is sufficient. Five million subscribers may be reached in less than five days. Even less if re-emitters, spread over the territory, are used. In order to obtain a permanent listening to broadcastings, it may be organised so that each card comprises two algorithms $A_n$ and $A_{n+1}$ and that the decoder is capable of choosing only the correct one. When the network sends broadcasting signals corresponding to $A_{n+1}$, $A_n$ is replaced by $A_{n+2}$ via r.f. transmission.

What is claimed is:

1. A method for the management of an application program in a microcircuit-based medium, comprising the following steps:
   preparing a first encrypted signature as a function of a secret code of the microcircuit and predetermined instructions of the program.
   loading said signature into a programmable memory of the microcircuit;
   loading said program into a program memory of the microcircuit;
   preparing a second encrypted signature in the microprocessor of the microcircuit during the execution of said application program;
   comparing the first signature to the second signature; and
   allowing said program to run if the first signature equals the second signature.

2. A method according to claim 1, wherein the program is stored in an erasable programmable memory.

3. A method according to claim 1, wherein a secret code is loaded into the circuit, this code being dedicated to the preparation of this signature.

4. A method according to claim 2, wherein said second signature is prepared and wherein said second signature is compared only when the application program is loaded into a working memory.

5. A method according to any one of the claims 1 to 4, wherein after said second signature is prepared said signature is compared several times during the execution of the program.

6. A method according to any one of claims 1 to 4, wherein said second signature is loaded into a memory region of the microcircuit which can only be read internally.

7. A method according to any one of claim 1 to 4, wherein said signatures are prepared also as a function of an identification code contained in the card.

* * * * *